United States Patent
Schurr

[19]

[11] Patent Number: 5,878,376
[45] Date of Patent: Mar. 2, 1999

[54] METHOD FOR CALIBRATING SCALES

[75] Inventor: Michael Schurr, Murrhardt, Germany

[73] Assignee: Soehnle-Waagen GmbH + Co., Murrhardt, Germany

[21] Appl. No.: 858,558

[22] Filed: May 19, 1997

[30] Foreign Application Priority Data

May 17, 1996 [DE] Germany ............ 196 19 854.2

[51] Int. Cl.$^6$ .................. G06F 19/00; G01G 23/01
[52] U.S. Cl. .................. 702/102; 702/85; 702/173; 177/25.13
[58] Field of Search ............ 364/567, 571.01–571.05, 364/528.4; 702/85, 87, 101, 102, 173; 172/25.13

[56] References Cited

U.S. PATENT DOCUMENTS 4,512,429  4/1985  Meier ........................ 177/25

FOREIGN PATENT DOCUMENTS 0 631 118 A1  12/1994  European Pat. Off. .
3712138A1    10/1987  Germany .
4320892       6/1994  Germany ............ G01G 23/01
4408232A1     9/1995  Germany .

OTHER PUBLICATIONS wd Fachbericht/Drahtloses Datenubertragungs– und –verarbeitungssystem fur Datenubertragung im eichpflichtigen Verkehr/wagen + dosieren —Feb. 1993/ pp. 48 & 49.

*Primary Examiner*—Kamini Shah
*Attorney, Agent, or Firm*—Jones, Tullar & Cooper, P.C.

[57] ABSTRACT

The invention relates a to method for calibrating scales having a weight-determining weighing system with a processor-controlled computer and with a memory unit for storing information regarding gravitational acceleration. The method can be executed at any arbitrary location without there being a possibility of performing manipulations contrary to the intended use, which includes the following steps: transmission of data regarding the location or place of operation of the scales via a wire or wireless telephone network from the location or place of operation to a receiving location; determination of information associated with the location or place of operation regarding the value of the gravitational acceleration at the location or place of operation of the scales on the basis of the data received at the receiving location; triggering the scales connected at the location or place of operation to the telephone network by a serial interface and a modem; and transmitting the determined information from the receiving location to the computer of the scales at the memory unit.

9 Claims, 1 Drawing Sheet

METHOD FOR CALIBRATING SCALES

BACKGROUND OF THE INVENTION

1. Field of the Invention

The present invention relates to a method for calibrating scales having a weight-determining weighing system with a processor-controlled computer and with a memory unit for storing information regarding gravitational acceleration (g).

2. Background Art

In connection with scales with a weighing system for determining weight, wherein the mass of an object is determined by its weight caused by gravitational acceleration and its effect on a sensor, the basically occurring problem is the dependence of the value of the gravitational acceleration on the location where the scales have been placed or are being operated. For example, the value of the gravitational acceleration varies between 9.797 and 9.825 m/s$^2$ within the range of the European Community from approximately 70° to 35° north latitude. The value of the gravitational acceleration is further affected by the distance of the location where the scales are placed or operated from sea level or mean sea level (MSL). However, this effective value is of lesser importance; it is often neglected or taken into consideration in the calculation by means of the product of a correction factor, which is a function of the north latitude of the location, and the height above MSL.

The problem can be addressed by either determining the location of the scales and calculating the local gravitational acceleration from this or taking it from a memory or data bank, or calibrating the scales by means of weights directly at its location. The detected value of the gravitational acceleration is stored in a memory unit of the scales and is appropriately processed during weighing in the course of the operation of the scales.

In DE 44 08 232 A1 it has already been proposed to provide a satellite receiver circuit in a correction device inside the scales, which determines geographic position data by means of received satellite signals, then calculates a correction value and displays a weight result corrected on the basis of the correction value. For a position determination by means of the so-called GPS (Global Positioning System) the error-free reception from at least four satellites is required, which means that a direct visual connection with these four satellites must be provided. Reflections, i.e. multiple receptions, because of mountains or buildings can degrade the reception and can even make it impossible. It is practically impossible to perform the correct calibration of scales when in a mass of houses. A further disadvantage of the known system is to be seen in that, because of the time cycle in which the GPS signals are transmitted at present, 12.5 min are required, even with a clear visual contact with the satellites, for determining the location information. The manufacture of a scales is made not inconsiderably more expensive by the installation of a GPS system.

SUMMARY OF THE INVENTION

An object of the present invention is therefore based on providing a method for calibrating scales of the type mentioned at the outset, wherein the above mentioned disadvantages do not occur and operational errors can be prevented to the greatest extent. Furthermore, no possibility exists for performing manipulations in a way contrary to the intended use during re-calibration, which have an effect on the value of the gravitational acceleration.

This object is attained in accordance with the present invention by a method of the type described at the outset, which comprises the following process steps:

—transmission of data regarding the location or place of operation of the scales via a wire or wireless telephone network from the location or place of operation to a receiving location;

—determination of information associated with the location or place of operation regarding the value of the gravitational acceleration at the location or place of operation of the scales on the basis of the data received at the receiving location; and —triggering the scales connected at the location or place of operation to the telephone network by means of a serial interface and a modem, and transmitting the determined information to a computer of the scales, where they are stored in the memory unit.

Thus, in accordance with the present invention a telephone network is utilized for transmitting data regarding or characterizing scales to be calibrated from the location or place of operation to a receiving location. The receiving location can be, for example, the headquarters of the manufacturer or of the customer service of the manufacturer, where further data processing is performed. This further data processing consists in that information regarding the value of the gravitational acceleration at the location of the scales is determined on the basis of the transmitted data, which directly or by means of any arbitrary coding identify the location or place of operation of the scale. This can actually be done in ways ranging from employing preprepared lists up to the most extensive data banks, which are interrogated under computer control. The information regarding the value of the gravitational acceleration at the location of the scales to be determined in this way can either be the value of g directly, or correction values or correction factors of the value of g, but it is also possible that numerical values from the data bank are assigned to defined variables for the calculated determination of the value of g, which are only employed in the computer of the scales for calculating the value of g. After the above described information has been determined, it is again transmitted over the telephone network to the computer of the scales at the location or place of operation of the scales, where it is stored in memory directly or after further data processing by the computer. There is therefore no possibility of manipulating the data at the location of the scales. Even if the data first transmitted from the location of the scales to the receiving location are false and therefore do not identify the true location of the scales, this can be detected by means of the telephone number, which is required for the return transmission of the information regarding the gravitational acceleration.

Thus, a possibility is created in accordance with the present invention, to perform re-calibration of a scales at any arbitrary location on earth, as long as there is a telephone connection available.

In the simplest case, a call is made from the location or place of operation or sale of the scales, which preferably can be the location of a sales branch of the manufacturer, to the manufacturer, and subsequently the data regarding the location or place of operation of the scales are simply sent by telephone to the manufacturer or receiving location. However, in a further development of the present invention it is proposed to transmit this data from the location of the scales to the receiving location by using a modem connected to the telephone network. In this case errors are more easily prevented and there is the possibility of providing computer-controlled arrangements at the location of the scales which allow calibration on a large scale in an economical manner.

In accordance with another aspect of the present invention of particular importance, the data regarding the location or place of operation of the scales are the local area code of the telephone network at the location or place of operation. It is possible by means of the local area code transmitted via the telephone network to the receiving location, which can also be achieved solely by dialing a PC provided at the receiving location and appropriate software, to start a fully automatic or freely programmable procedure. The information associated with the appropriate local area code regarding the value of the gravitational acceleration is called up from a data base and is transmitted under computer control to the computer of the scales.

In accordance with a further variant of the present invention, further data, besides the data regarding the location or place of operation of the scales, for example the serial number of the scales to be calibrated, can be transmitted to the receiving location and checked there. To this end it is possible by using the computer at the receiving location to check the serial number for its validity, i.e. whether scales had been produced at all under this number, or it can be determined whether a re-calibration of the respective scales had already been performed, in particular in another location.

The user can check the correct data transmission at any time after the calibration has been performed by checking the local area code which had preferably also been transmitted and stored, by means of a display device, which should preferably be provided.

The present invention furthermore relates to a scale for executing the above described method, with a weighing system for determining weight, a processor-controlled computer and a memory unit for storing information regarding the gravitational acceleration (g), which is distinguished by a serial interface to be connected to a modem cooperating with the telephone network and a computer program for triggering this modem.

BRIEF DESCRIPTION OF THE DRAWINGS

The single FIGURE illustrates the functional principle of the calibration method in accordance with the present invention.

DETAILED DESCRIPTION OF THE INVENTION

Figure 1:
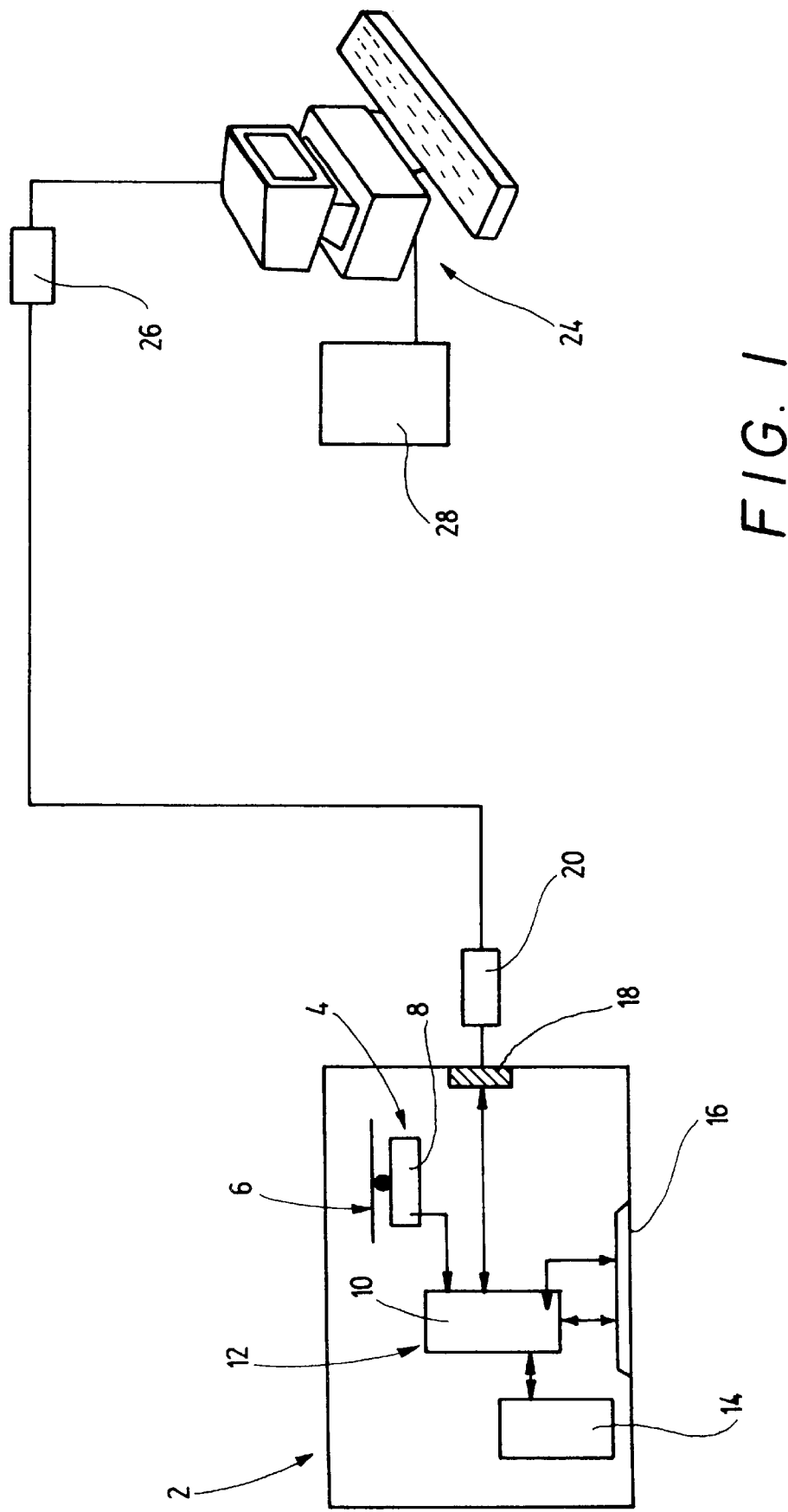

The drawing FIGURE shows in a schematic representation a scale 2 with a weighing system 4 for determining a weight, which comprises a sketched-in load receiver 6 and a sensor 8 for detecting the weight. Following digitalization, electrical signals corresponding to the measured weight are sent to a computing unit 10 of an internal processor-controlled computer 12 and are processed. The value of the gravitational acceleration is taken from a memory unit 14 of the computer 12 for processing the measured value and, using this value, a mass value corresponding to the measured weight is calculated and displayed on a display unit 16. The computing unit 10 is furthermore connected with a serial interface 18, through which the scale 2 or the central computing unit 10 can be connected with, an indicated telephone network 22 by means of a modem 20.

The just described scale 2 can be located at any telephone network connection anywhere on earth and can be connected in this way with a telephone connection in a manufacturer's branch office or customer service center or the like, identified as the receiving location. At this receiving location, a further processor-controlled computer 24, preferably a PC, is also connected via a modem 26 to the telephone network 22. The computer 24 has access to a data bank 28, in which information regarding the value of the gravitational acceleration is stored, preferably for all locations with a defined local area code, and can be called up. When the scale 2 is to be calibrated at its location or place of operation, it is connected via its serial interface 18 and a modem 20 to the telephone network 22. Subsequently the computer 24 at the receiving location is dialed, for example by means of an already established program in the computer 12, and a preferably fully automatic procedure is started by means of this. After the telephone connection between the internal computer 12 in the scales and the computer 24 at the receiving location has been made, the local area code of the location or place of operation from which the computer 24 was dialed is transmitted to the receiving location, and then the connection is terminated. The computer 24 now accesses the data bank 28 and takes out the information regarding the value of the gravitational acceleration at the location or place of operation of the scale 2 associated with the respective local area code. This information can exist in the form of geographical data of the location or place of operation, but can also be previously calculated correction factors for a value of the gravitational acceleration already stored in the scale, or the value of the gravitational acceleration at the location or place of operation is already stored in the data bank 28. After accessing the data bank 28, the information taken from it is entered into the telephone network 22 via the modem 26 and transmitted to the telephone number to which the scale 2 or the modem 20 is connected and is entered into the central computing unit 10 of the computer 12 again in digital form. To the extent that the information consists of geographical data, such as the geographic latitude, the elevation above MSL, or the like, the value of the gravitational acceleration applicable to the location of the scale 2 is calculated in a manner known per se and then stored in the memory unit 14. If the value of the gravitational acceleration at the location of the scale is already transmitted via the telephone network 22, this value can be directly forwarded to the memory unit 14. Because of the direct "dialog" between the computer 24 at the receiving location and the computer 12 in the scales 2 at the location or place of operation, there is no possibility for the user will affect the value of the gravitational acceleration contrary to the intended use.

I claim:

1. A method for calibrating a scale having a weight-determining weighing system with a processor-controlled computer and with a memory unit for storing information regarding gravitational acceleration (g), using a wire or wireless telephone network, comprising the steps of:

transmitting data regarding the location or place of operation of the scale via the wire or wireless telephone network from the location or place of operation to a receiving location, the data regarding the location or place of operation of the scales being the local area code of the telephone network at the location or place of operation;

determining the information associated with the location or place of operation regarding the value of the gravitational acceleration at the location or place of operation of the scale on the basis of the data received at the receiving location;

triggering the scale connected at the location or place of operation to the telephone network by means of a serial interface and a modem, and transmitting the determined information from the receiving location to the computer of the scale at the location or place of operation, where they are stored in the memory unit.

2. The method in accordance with claim 1, wherein the data regarding the location or place or operation of the scale is transmitted to the receiving location by means of a modem connected to the telephone network.

3. The method in accordance with claim 1, wherein further data, for example the serial number of the scale to be calibrated, is transmitted from the location or place of operation to the receiving location and is checked there.

4. The method in accordance with claim 3, wherein a determination is made by means of said further data whether the respective scale has already been previously re-calibrated.

5. The method in accordance with claim 1, wherein in the course of transmitting said determined information from the receiving station to the computer of the scale, additional data is also transmitted, in particular the local area code of the location or place of operation, which makes it possible to check at the location or place of operation of the scale for which location the scale was calibrated.

6. The method in accordance with claim 5, wherein the additionally tranmitted data is stored in the memory unit and in this way can be called up at the scale at any time.

7. A scale, to be calibrated via a wire or wireless telephone network, comprising: a weighing system for determing weight; processor-controlled computer; a memory unit for storing information regarding the gravitational acceration (g); a modem; and a serial interface for connection to said modem, wherein the local area code of the telephone network at the location or place of operation of the scale is transmitted via the wire or wireless telephone network to a receiving location, and information from the receiving location is transmitted back via the wire or wireless telephone network.

8. The scale in accordance with claim 7, further comprising: a display unit on which the data, preferably the local area code, regarding the location or place of operation of the scale can be displayed.

9. The method in accordance with claim 2, wherein the data regarding the location or place of operation of the scale is the local area code of the telephone network at the location or place of operation.

* * * * *